A. ADAMSON.
COLLAPSIBLE CORE.
APPLICATION FILED JULY 21, 1914.

1,125,431.

Patented Jan. 19, 1915.

Witnesses
Edwin L. Yewell
A. H. Mills

Inventor
Alexander Adamson
By Percy B. Hills
Attorney

UNITED STATES PATENT OFFICE.

ALEXANDER ADAMSON, OF AKRON, OHIO.

COLLAPSIBLE CORE.

1,125,431.   Specification of Letters Patent.   Patented Jan. 19, 1915.

Application filed July 21, 1914. Serial No. 852,299.

*To all whom it may concern:*

Be it known that I, ALEXANDER ADAMSON, a citizen of the United States, residing at Akron, in the county of Summit and State of Ohio, have invented certain new and useful Improvements in Collapsible Cores; and I do hereby declare the following to be a full, clear, and exact description of the invention, such as will enable others skilled in the art to which it appertains to make and use the same.

Figure 1:
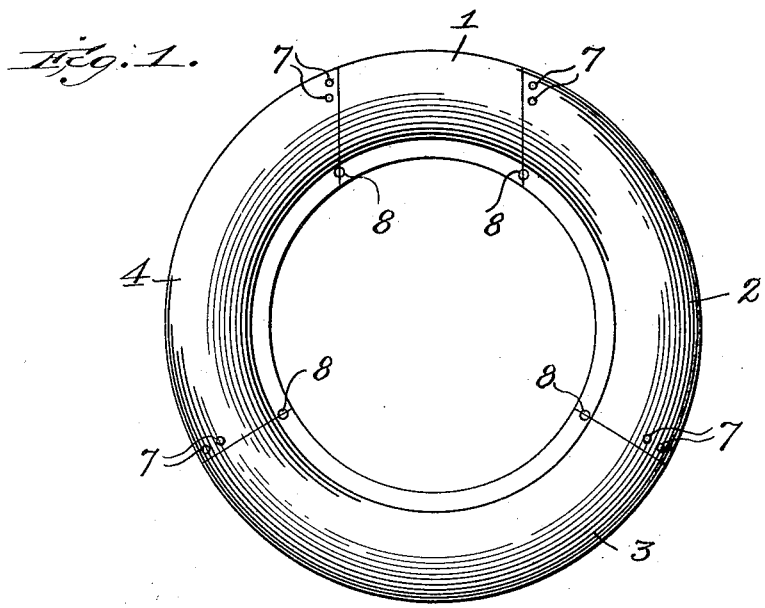
Figure 2:
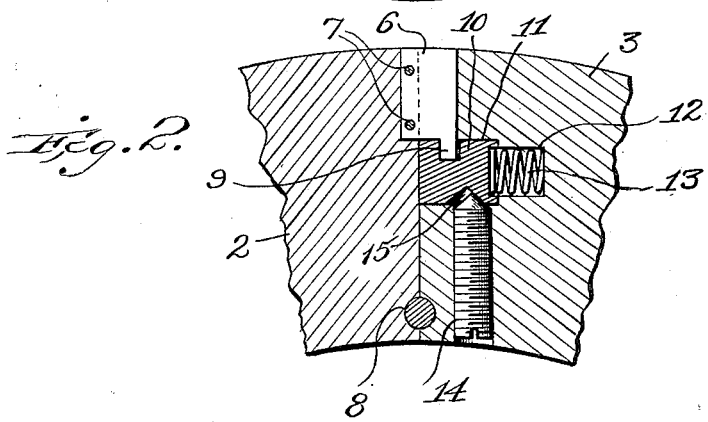
Figure 3:
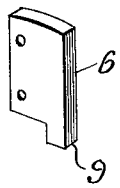

My invention relates to collapsible cores used in the manufacture of tire casings, and embodies certain improvements over the construction disclosed in Letters Patent No. 1,007,626, granted to me October 31, 1911, as will be described more fully hereinafter, reference being had to the accompanying drawing, in which:

Figure 1 is a plan view of a ring embodying my invention. Fig. 2 is an enlarged longitudinal central sectional view of a portion of the same, taken at the abutting ends of two of the segments of said core. Fig. 3 is a detail perspective view of one of the parts.

Similar numerals of reference denote corresponding parts in the several views.

The ring-core is constructed of a plurality of segment-shaped members, which, when united by means to be hereinafter described, constitute an annulus, the outer portion of which is shaped to impart the desired configuration to the inner wall of a tire-shoe manufactured thereon. These segment-shaped members are designated in the drawings by the reference numerals 1, 2, 3, and 4, and are designed to be assembled with their ends arranged in abutting relation to form, when so assembled, a complete annulus. The means for joining the various segments together are all similar and hence a description of one is deemed to be sufficient. It will be assumed that the description which follows refers to the uniting of segments 2 and 3.

In order to secure perfect registration between contiguous segments the abutting ends of the outer or tread-forming portions of the segment-shaped members are provided with alined recesses to receive a key 6 which is preferably secured to one member by some means, such as pins 7, so that as the segment 3 is withdrawn inwardly the key 6 offers no obstacle to its movement. The key 6 secures perfect registration between the outer tread-forming portions of the segments and prevents lateral displacement of one member with respect to the remaining members, and in order to prevent radial displacement of one member with respect to its contiguous member, dowel pins 8 are inserted in openings preferably extending transversely through the flanges of contiguous members at the joint between them.

In order to lock the segments together each key 6 is formed at its outer lower end into a lip 9 that engages a slot formed in a bolt 10 that is disposed in a recess 11 in the other abutting segment, which, as illustrated in Fig. 2 is the segment 3. Disposed in a smaller recess 12 registering with recess 11 is a coiled spring 13 which exerts its tension on said bolt 10 normally to force it outward. Threaded into the inner side of the segment 3 is a screw 14 which has an inner conical end engaging a conical recess 15 in the bolt 10 but on one side of said recess only, as shown.

In operation the segments are assembled by first alining them by means of the keys 6, the screws 14 being retracted slightly to permit the bolts 10 to be projected by the springs 13, this movement of the bolts 10 being permitted because of the conical engagement between bolts 10 and the ends of screws 14. This brings the slots in the bolts 10 forward sufficiently to permit the ready insertion thereinto of the lips 9 of keys 6, after which, by adjusting the screws 14 inward the bolts 10 will be forced inward, thus, through the keys 6, drawing the abutting faces of the segments into intimate contact. The dowel pins 8 are now inserted, and the device is assembled ready to receive the tire shoe thereon. After the vulcanization of the tire shoe thereon the core is removed by reversing the assembling operation, it being customary in practice first to withdraw the segment 1, which forms the key to the device, after which the segments 2, 3 and 4 may be removed.

Having thus described my invention, what I claim as new and desire to secure by Letters Patent is:

1. A device of the class described, comprising a plurality of segment-shaped members adapted to abut endwise against each other to form a collapsible ring-core, a key fixed to one member and projecting therefrom into a recess in the contiguous member, a bolt disposed in a recess in said contiguous member with which said key has locking engagement, and means for shifting said bolt inward when the parts are interlocked to draw the abutting faces of said members together.

2. A device of the class described, comprising a plurality of segment-shaped members adapted to abut endwise against each other to form a collapsible ring-core, a key fixed to one member and projecting therefrom into a recess in the contiguous member, a bolt disposed in a recess in said contiguous member with which said key has locking engagement, and a screw in said contiguous member having a conical inner end adapted to engage a conical recess in said bolt whereby rotary movement of said screw will impart longitudinal movement to said key in a direction to draw the abutting faces of said members together through the locking engagement of said key with said bolt.

3. A device of the class described, comprising a plurality of segment-shaped members adapted to abut endwise against each other to form a collapsible ring-core, a key fixed to one member and projecting therefrom into a recess in the contiguous member, a bolt disposed in a recess in said contiguous member with which said key has locking engagement, said bolt being spring pressed outwardly, and a screw in said contiguous member having a conical inner end adapted to engage a conical recess in said bolt to limit outward movement of said bolt and when turned adapted to force said bolt inward, whereby the abutting faces of said members will be drawn together through the locking engagement of said key with said bolt.

In testimony whereof I have set my hand in the presence of two subscribing witnesses.

ALEXANDER ADAMSON.

Witnesses:
H. W. SLABAUGH,
C. L. FENN.

Copies of this patent may be obtained for five cents each, by addressing the "Commissioner of Patents, Washington, D. C."